United States Patent
Tsuei

[15] 3,644,863
[45] Feb. 22, 1972

[54] METALLIC RESISTANCE THERMOMETER

[72] Inventor: Chang-Chyi Tsuei, Pasadena, Calif.

[73] Assignee: California Institute Research Foundation, Pasadena, Calif.

[22] Filed: Apr. 10, 1969

[21] Appl. No.: 815,162

[52] U.S. Cl. ........................338/25, 73/362, 75/172
[51] Int. Cl. .........................................G01k 7/22
[58] Field of Search............73/362 R; 338/25, 22; 75/172, 75/134

[56] References Cited

UNITED STATES PATENTS 3,241,370  3/1966  Mertler........................73/362
3,436,713  4/1969  Di Noia........................73/362

OTHER PUBLICATIONS

Transactions of the American Society for Metals, Volume 60, page 610 (1967), article entitled "Structure and Properties of Alloys Rapidly Quenched from the Liquid State" by Pol Duwey.

Journal of Applied Physics, Volume 37, page 435 (1966), article entitled "Metastable Amorphous Ferromagnetic Phases in Palladium-Base Alloys" by Tsuei et al.

Primary Examiner—Louis R. Prince
Assistant Examiner—Denis E. Corr
Attorney—Charlton M. Lewis

[57] ABSTRACT

A class of alloys, when converted to amorphous form by quenching from the molten state, is useful for sensing temperature by virtue of a temperature coefficient of electrical resistivity that is negative over a usefully wide range, including the neighborhood of absolute zero. Such alloys comprise three components: a metal of the platinum series, silicon or germanium, and an inner member of the first series of transition metals. A preferred type of composition is $Pd_{80-x}Si_{20}Cr_x$, where $x$ may have any value up to about 8.

7 Claims, 3 Drawing Figures

PATENTED FEB 22 1972 3,644,863

INVENTOR.
CHANG-CHYI TSUEI,
By Charlton M Lewis

METALLIC RESISTANCE THERMOMETER

The invention described herein was made in the course of, or under, a contract with the United States Atomic Energy Commission.

This invention has to do with metallic resistance thermometers that are especially useful for measuring cryogenic temperatures.

In conventional resistance thermometers having a metallic sensing element, the electrical resistivity decreases with decreasing temperature, both the resistivity and its temperature coefficient reaching very low values when approaching absolute zero. Hence conventional metallic resistance thermometers become less sensitive with decreasing temperature, and are essentially ineffective below about 20° K.

In accordance with the present invention, a new class of alloys, when prepared in amorphous form, have been found to exhibit an electrical resistivity having anomalous temperature dependence. The resistivity of such compositions behaves in essentially normal manner down to a definite critical temperature. Below that critical temperature, however, the normal direct dependence upon temperature is reversed, and the resistivity increases with decreasing temperature. The invention thus makes available metal alloys with negative temperature coefficient of resistivity over a usefully wide temperature range, a property that was previously available only in semiconductive materials.

Such compositions are particularly useful for measuring temperatures in the range below the critical or inversion temperature, since the sensitivity of response then increases with decreasing temperature. Moreover, some of the compositions of the invention have inversion temperatures well above room temperature, typically in the range from 300° to 500° K. Resistance thermometers prepared from those metals permit continuous measurement with progressively increasing sensitivity from normal temperatures down to the region near absolute zero. The sensitivity of such thermometers is typically comparable to that of a conventional platinum thermometer at room temperature, increasing to five or 10 times that sensitivity as absolute zero is approached.

The compositions of the present invention comprise a matrix of a first component which is a metal of the platinum series, comprising ruthenium, rhodium, palladium, osmium, iridium and platinum, and a second component which is silicon or germanium. To that two-component matrix is added a third component which is selected from the inner members of the first series of transition metals, comprising titanium, vanadium, chromium, manganese, iron and cobalt. Each of the three components of the present compositions may include two or more of the elements of the described class, and such terms as "selected from the class" are intended to include such multiple selections unless the contrary is specifically indicated. The alloy is converted to amorphous form, essentially free of crystalline structure, as by extremely rapid quenching from the liquid state. The resulting amorphous composition is a metastable phase, but is effectively stable at ordinary temperatures. Preliminary kinetics data indicate that, at room temperature, the time required for reaching half of the transformation would be 1,000 years.

Amorphous compositions of the described type have many general properties in common, including the general form of the resistivity-temperature curve. The detailed form of that curve, however, varies with the selection of the three components within the described classes, and with the proportions in which those elements are combined. In particular, the minimum of the resistivity-temperature curve tends to occur at higher temperatures for higher relative concentration of the transition metal component, and for transition metals near the center of the group. In general, increased concentration of the transition metal also makes more difficult the conversion of the composition to amorphous form, whereas that conversion is facilitated when the relative concentration of the second component corresponds approximately to the eutectic composition.

The preferred compositions for use as temperature sensing elements are those for which the temperature coefficient of resistivity changes sign will above room temperature. Such compositions include, in particular, those in which the first component is palladium, the second component is silicon and the third component is chromium. Such compositions are most readily rendered amorphous when the silicon content is within the range from about 17 to about 21 atomic percent, values close to 18 at. percent being preferred. The chromium content is preferably from about 3 to about 8 at. percent. With much higher concentrations of chromium the composition can be rendered amorphous only by more rapid quenching than is conveniently obtainable at the present time.

A further understanding of the invention will be had from the following described specific examples, which are intended to be merely illustrative and not limitative of the invention. In connection with those examples reference is made to the appended drawings, in which.

Figure 1:
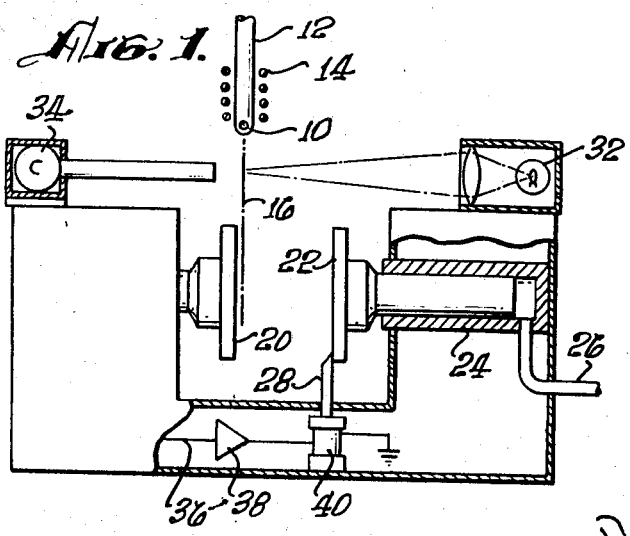
FIG. 1 is a schematic elevation, partly broken away, representing illustrative apparatus for the rapid quenching of molten alloys.

The presently preferred procedure for converting alloys of the described type to the metastable amorphous form involves extremely rapid quenching from the liquid state by compressing a drop of the liquid alloy between two opposed piston faces which are moved together at high speed. FIG. 1 shows illustrative "piston and anvil" apparatus, based on that described by P. Pietrokowsky in Review of Scientific Instruments, 34, page 445 (1963). Similar apparatus has been used for producing a wide variety of new amorphous alloys, as described, for example, by Pol Duwez in Transactions of the American Society for Metals 60, page 607 (1967) and by the present applicant and Pol Duwez in the Journal of Applied Physics 37, page 435 (1966). However, the present anomalous behavior of the temperature coefficient of resistance in a definite class of amorphous compositions has not previously been described.

The sample 10 is placed in the silica tube 12 with constricted outlet at its lower end. The sample can be melted rapidly by the induction heating coil 14, and is then expelled from the tube at low velocity by applying to the tube a gas pressure just sufficient to overcome the surface tension of the molten drop. The drop falls along the path 16, closely parallel to the face of the anvil 20, which is preferably mounted on a shock-absorbing support. The piston 22 slides in the cylinder 24, directly facing anvil 20. The opposing faces of the piston and anvil are typically lines with replaceable copper disks that are accurately plane, and may be cooled below room temperature. Piston 22 is urged toward the anvil by gas at selected pressure supplied to cylinder 24 via the tube 26, but is normally held in the position shown in FIG. 1 by the trigger 28.

As the molten allow drop 10 falls along path 16 it breaks the light beam 30 between the source 32 and the photocell 34, producing a signal pulse on the line 36. That pulse is amplified by circuitry 38, which includes an adjustable delay circuit. The resulting current pulse energizes the solenoid 40, retracting trigger 28 and releasing piston 22. The piston attains relatively high velocity, squeezing the sample drop against the face of the anvil and quenching the molten drop to a thin foil of solid alloy. That foil is typically about 2.5 cm. in diameter and of essentially uniform thickness approximating 0.04 mm., which is a convenient form from which to fabricate temperature sensing elements.

Rates of cooling during the quenching of a small drop with the piston and anvil technique are typically of the order of $10^{5°}$ to $10^{6°}$ C./sec. Faster cooling rates are obtainable with other known procedures, which are at present considered less con-

EXAMPLE I.

An alloy sample was prepared by weighing out finely divided palladium, silicon and chromium in amounts corresponding to 75, 20 and 5 at. percent, respectively, mixing the three components and melting them by induction heating in a quartz crucible under an argon atmosphere. The ingot was drawn into a wire and a small sample was melted and was quenched in the manner already described, producing a foil about 2.5 cm. in diameter and about 0.04 mm. thick. A temperature sensing element about 18 by 2 mm. was cut from the foil and current and potential leads of fine platinum wire were spot welded to the element. The resistivity of the sample was then measured as a function of ambient temperature, using conventional laboratory techniques. The resulting curve is shown at A in FIG. 2, with resistivity minimum at a temperature $T_{min}$ of about 475° K., or about 200° C. From that $T_{min}$ down to the neighborhood of absolute zero the resistivity-temperature curve has a slope that is increasingly negative. Throughout that range the sample provides a convenient and effective temperature sensing element, capable of measuring temperature continuously from well above room temperature to essentially absolute zero, and yielding a sensitivity of measurement that increases progressively with decreasing temperature.

EXAMPLE II

A temperature sensing element was prepared as described in Example I, except that the initial alloy contained only 0.5 at. percent chromium, the palladium content being increased correspondingly and the silicon content remaining unchanged. The resulting resistivity-temperature curve is shown at B in FIG. 2. The resistivity minimum is shifted to a temperature of about 45° K., reducing the low temperature range of continuous usefulness of the element as a temperature sensor. However, that range, extending from the neighborhood of absolute zero well above 20° K., can not be covered with anything like comparable sensitivity by any previously known metal resistance thermometer.

EXAMPLE III

A temperature sensing element was prepared as in Example I, but using an alloy comprising palladium, silicon and manganese in respective concentrations of 77, 20 and 3 atomic percent. The resulting resistivity-temperature curve is shown at C in FIG. 2, with $T_{min}$ at approximately 20° K. As described below, that point is shifted to higher temperatures with increased concentration of manganese, which may reach at least 7 at. percent.

EXAMPLE IV

A temperature sensing element was prepared as in Example III, but employing iron in place of manganese. As shown at D in FIG. 2, the resulting resistivity-temperature curve has a minimum at about 30° K.

EXAMPLE V

Figure 3:
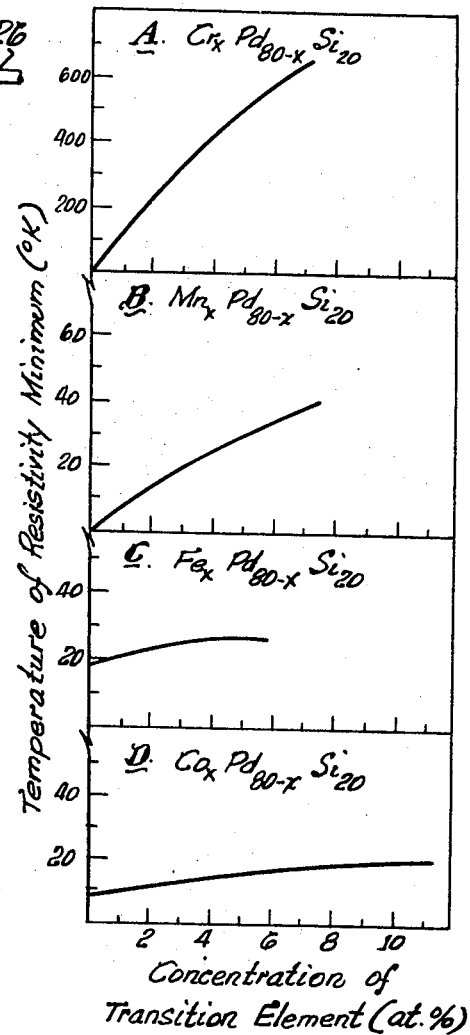
FIG. 3 is four graphs showing the inversion temperature as a function of the concentration of transition elements in such compositions.

A series of temperature sensing elements utilizing cobalt in place of chromium was produced, corresponding to the formula $Co_xPd_{80-x}Si_{20}$ with $x$ varying in steps of 2 units each from 1 to 11 atomic percent. FIG. 3 represents in curve D the variation of $T_{min}$ as a function of cobalt concentration in those elements. For this particular series of compositions $T_{min}$ is relatively independent of cobalt concentration, varying from about 10° to about 20° K.

Additional compositions were prepared corresponding to Examples I and II, III and IV, but varying the concentration of the transition element stepwise in steps of 1 or 2 atomic percent throughout the range of 0.5 to 7 for chromium, 1 to 7 for manganese and 0.5 to 7 for iron. Temperature sensing elements were prepared from each of those compositions and curves similar to the curves of FIG. 2 were plotted for each element, from which the value of $T_{min}$ was determined. FIG. 3 shows at A, B and C the general trend of that temperature of minimum resistivity as a function of the transition element concentration for compositions containing chromium, manganese and iron, respectively, those curves being comparable to curve D for cobalt, already described. Curve A of FIG. 3 shows that in compositions of the formula $Cr_xPd_{80-x}Si_{20}$ the range of $x$ from about 3 to about 8 is particularly useful, since the region of negative temperature coefficient of resistivity then includes normal or room temperature.

Figure 2:
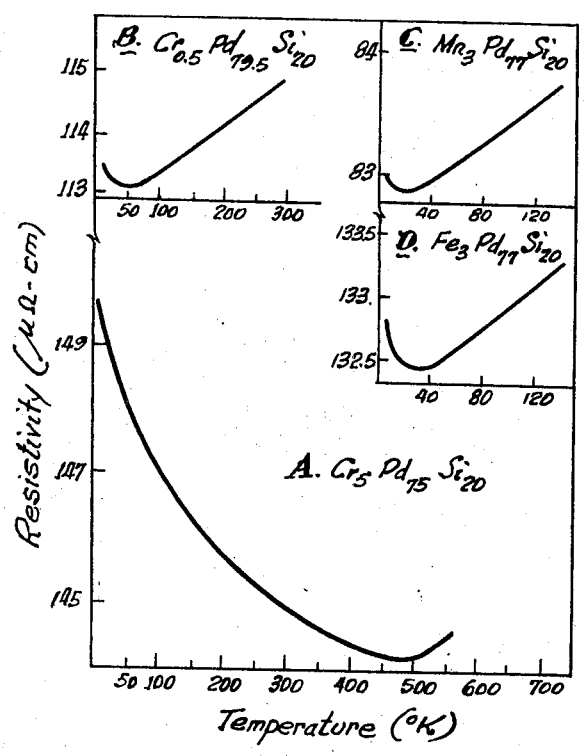
FIG. 2 is four graphs showing the resistivity as a function of temperature for typical compositions in accordance with the invention.

The specific compositions described and illustrated in FIGS. 2 and 3 may be varied by replacing palladium by platinum or by another of the metals of the platinum series. The metals of the platinum series, as that term is used in the present specification and claims, include ruthenium, rhodium, palladium, osmium, iridium and platinum. Also, the silicon component of the above examples may be replaced by germanium. As already indicated, chromium is generally preferred for use as third component in the compositions of the invention. However, that preferred metal may be replaced or supplemented by other inner members of the first series of transition metals. The inner members of the first series of transition metals, as that phrase is used in the present specification and claims, include titanium, vanadium, chromium, manganese, iron and cobalt, which are all the members of the first series of transition metals except the first and last members of that series, selenium and nickel. The most advantageous relative proportions in which to combine the three components of such compositions may vary considerably with each particular selection of elements, but accord with the general considerations already described.

I claim:
1. A temperature sensing element, comprising a body of an amorphous solid composition containing a first component selected from the metals of the platinum series, a second component selected from the group consisting of silicon and germanium, and a third component which is chromium,
   the second component being present in relative amount corresponding approximately to the eutectic composition,
   and the third component being present in such relative amount that the temperature coefficient of electrical resistivity of the amorphous composition is negative at least in the temperature range below about 20° K.,
   and electrically conductive leads adhered in electrically conductive relation to respective mutually spaced portions of the body.

2. A temperature sensing element as defined in claim 1, and in which said first component is selected from the group consisting of palladium and platinum.

3. A temperature sensing element as defined in claim 1, and in which said first component is palladium, and said second component is silicon and is present in an amount between about 17 and about 21 atomic percent with respect to the entire composition.

4. A temperature sensing element as defined in claim 1, and in which said second component is silicon and said components are present in such mutual concentration that the composition is convertible to amorphous form by quenching from the liquid state.

5. A solid composition of matter containing between about 17 and about 21 atomic percent silicon and between about 3 and about 8 atomic percent chromium, with the balance consisting essentially of a metal of the platinum series,
   said composition being substantially completely amorphous and having a temperature coefficient of electrical resistivity that is negative at temperatures less than about 300° K.

6. A solid composition as defined in claim 6, and in which said metal of the platinum series is palladium.

7. A solid composition of matter containing a first component selected from the metals of the platinum series, a second component selected from the group consisting of silicon and germanium, and a third component which is chromium, said composition being substantially completely amorphous and having a temperature coefficient of electrical conductivity that is negative at least at temperatures below about 20° K.

* * * * *